US012569399B2

(12) United States Patent
Li et al.

(10) Patent No.: US 12,569,399 B2
(45) Date of Patent: Mar. 10, 2026

(54) MASSAGE MACHINE

(71) Applicant: XIAMEN COMFIER TECHNOLOGY CO., LTD., Fujian (CN)

(72) Inventors: Jianqing Li, Xiamen (CN); Song Yang, Xiamen (CN); Lei Leng, Xiamen (CN)

(73) Assignee: XIAMEN COMFIER TECHNOLOGY CO., LTD., Xiamen (CN)

( * ) Notice: Subject to any disclaimer, the term of this patent is extended or adjusted under 35 U.S.C. 154(b) by 1120 days.

(21) Appl. No.: 17/551,186

(22) Filed: Dec. 15, 2021

(65) Prior Publication Data

US 2022/0409480 A1 Dec. 29, 2022

(30) Foreign Application Priority Data

Jun. 28, 2021 (CN) ......................... 202121446880.7

(51) Int. Cl.
*A61H 23/02* (2006.01)

(52) U.S. Cl.
CPC . *A61H 23/0263* (2013.01); *A61H 2201/0138* (2013.01); *A61H 2201/1215* (2013.01); *A61H 2201/14* (2013.01); *A61H 2205/12* (2013.01)

(58) Field of Classification Search
CPC .......... A61H 23/00–06; A61H 2205/10; A61H 2205/106; A61H 2205/12; B06B 1/045
USPC ........................................................... 601/46
See application file for complete search history.

(56) References Cited

U.S. PATENT DOCUMENTS

2023/0233871 A1 * 7/2023 Jafarzadeh ........ A61M 37/0092 601/17

FOREIGN PATENT DOCUMENTS

DE 202019106743 U1 * 1/2020 ........... A61H 23/006
KR 102092519 B1 * 3/2020 ........... A61H 1/0266

OTHER PUBLICATIONS

Translation of DE 202019106743-U. Accessed from PE2E-Search on Sep. 30, 2025. (Year: 2020).*
Translation of KR 102092519-B1. Accessed from PE2E-Search on Sep. 30, 2025. (Year: 2020).*

* cited by examiner

*Primary Examiner* — Paige Kathleen Bugg
(74) *Attorney, Agent, or Firm* — Birchwood IP

(57) ABSTRACT

A massage machine includes a casing unit, a drive device, a transmission mechanism, and two massage plate units. Two ends of the transmission mechanism are linked with the massage plate units, respectively. The drive device drives the transmission mechanism. The transmission mechanism and the drive device are disposed in the casing unit. The massage plate units are disposed on the casing unit. The massage machine uses a single drive device to drive the transmission mechanism, so that the transmission mechanism can link the two massage plate units to massage a user.

8 Claims, 8 Drawing Sheets

MASSAGE MACHINE

BACKGROUND OF THE INVENTION

1. Field of the Invention

The present invention relates to massage equipment, and more particularly to a massage machine.

2. Description of the Prior Art

A conventional massage device includes two massage plates each driven by a drive device. A transmission structure is provided between each drive device and the corresponding massage plate, which makes the overall structure of the massage machine complex and bulky.

SUMMARY OF THE INVENTION

The primary object of the present invention is to provide a massage machine that has a simple structure and is small in size.

In order to achieve the above object, the present invention adopts the following technical solutions.

A massage machine comprises a casing unit, a drive device, a transmission mechanism, and two massage plate units. Two ends of the transmission mechanism are linked with the massage plate units, respectively. The drive device drives the transmission mechanism. The transmission mechanism and the drive device are disposed in the casing unit. The massage plate units are disposed on the casing unit.

Preferably, the transmission mechanism includes a shaking shaft and two transmission units. The transmission units are installed to two ends of the shaking shaft, respectively. A first pulley is fitted on the shaking shaft. The first pulley is located between the transmission units. A second pulley is fitted on an output shaft of the drive device. The first pulley and the second pulley are linked by a belt.

Preferably, the transmission unit includes an eccentric wheel and a cover assembly. The eccentric wheel is mounted to one end of the shaking shaft. The eccentric wheel is inserted in a lower end of the cover assembly. An upper end of the cover assembly extends out of the casing unit and is fixedly connected to a corresponding one of the massage plate units.

Preferably, the transmission unit further includes a first bearing, a second bearing, and an eccentric wheel cover. The eccentric wheel cover is configured to secure the eccentric wheel to the cover assembly. The eccentric wheel is fitted to the second bearing. An axle of the eccentric wheel extends out of the cover assembly. The eccentric wheel cover has a wheel cover shaft extending inward. The first bearing is sleeved on the wheel cover shaft of the eccentric wheel cover.

Preferably, the cover assembly includes a bearing inner cover and a bearing outer cover. The bearing inner cover is detachably connected to the bearing outer cover for securing the second bearing and the eccentric wheel. The axle of the eccentric wheel extends out of the bearing outer cover. The wheel cover shaft of the eccentric wheel cover extends out of the bearing inner cover.

Preferably, the casing unit includes an upper casing and a lower casing connected to the upper casing. The upper casing is provided with two shaft seat assembles. A middle portion of a back of the massage plate unit is formed with a pivot shaft hole. A rotatable massage plate shaft passes through the pivot shaft hole. The massage plate shaft is locked to a corresponding one of the shaft seat assemblies. The drive device is fixed to the lower casing.

Preferably, the massage plate unit includes a massage plate body, a massage plate frame, and a massage plate retainer. The massage plate body is fixed on the massage plate frame. The pivot shaft hole is defined in a middle portion of a back of the massage plate frame. The massage plate retainer is fixed at a front end of the back of the massage plate frame. A back of the massage plate retainer is formed with a pivot hole. One end of the transmission mechanism is pivotally connected to the corresponding pivot hole.

Preferably, one end of the transmission mechanism is provided with a damping pad. A fixing screw rod passes through the pivot hole and the corresponding damping pad. One end of the fixing screw rod is screwed with a nut.

Preferably, an outer side of a top of the massage plate body is tilted upward at an angle of 2° to 20°.

Preferably, the angle is 4°.

Preferably, the drive device is a motor.

Preferably, an upper surface of the casing unit is recessed with a button area. A plurality of buttons for controlling operation of the drive device is provided in the button area. A button cover is detachably connected to the button area. The button cover is configured to cover the buttons. A lower surface of the casing unit is provided with a plurality of spaced feet.

With the foregoing technical solutions, the massage machine provided by the present invention uses a single drive device to drive the transmission mechanism, so that the transmission mechanism can link the two massage plate units to massage the user, thereby simplifying the structure. The structure of the massage machine is simple and the overall volume is small.

DETAILED DESCRIPTION OF THE PREFERRED EMBODIMENTS

Embodiments of the present invention will now be described, by way of example only, with reference to the accompanying drawings.

Figure 1:
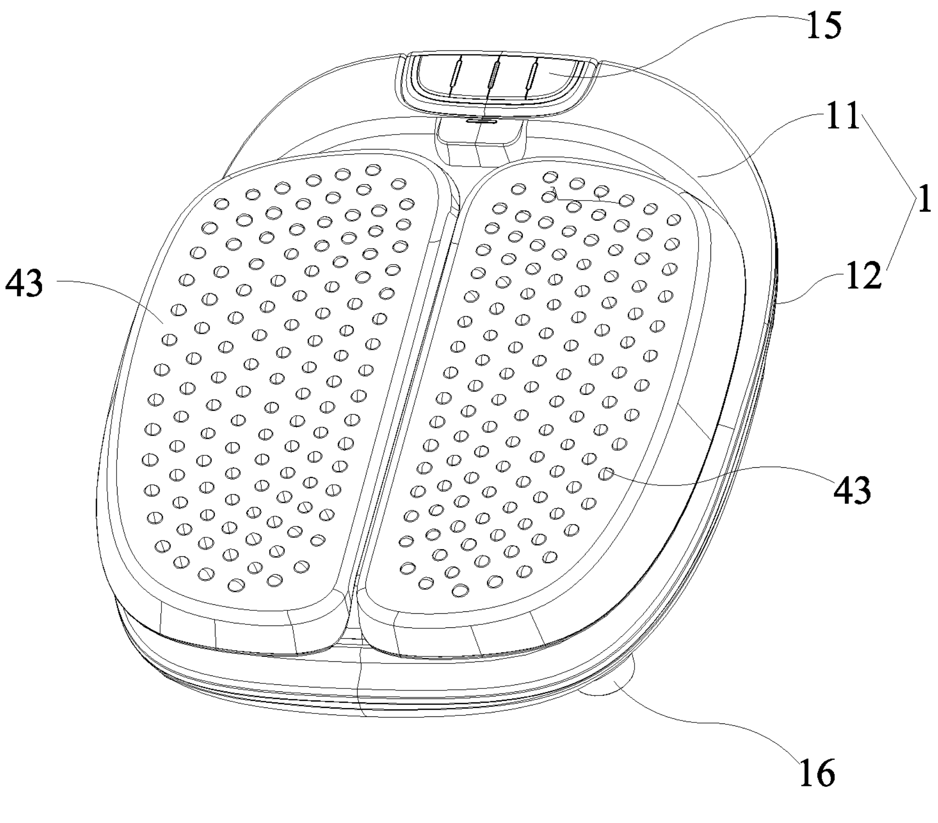
FIG. 1 is a perspective view according to a first embodiment of the present invention.
Figure 2:
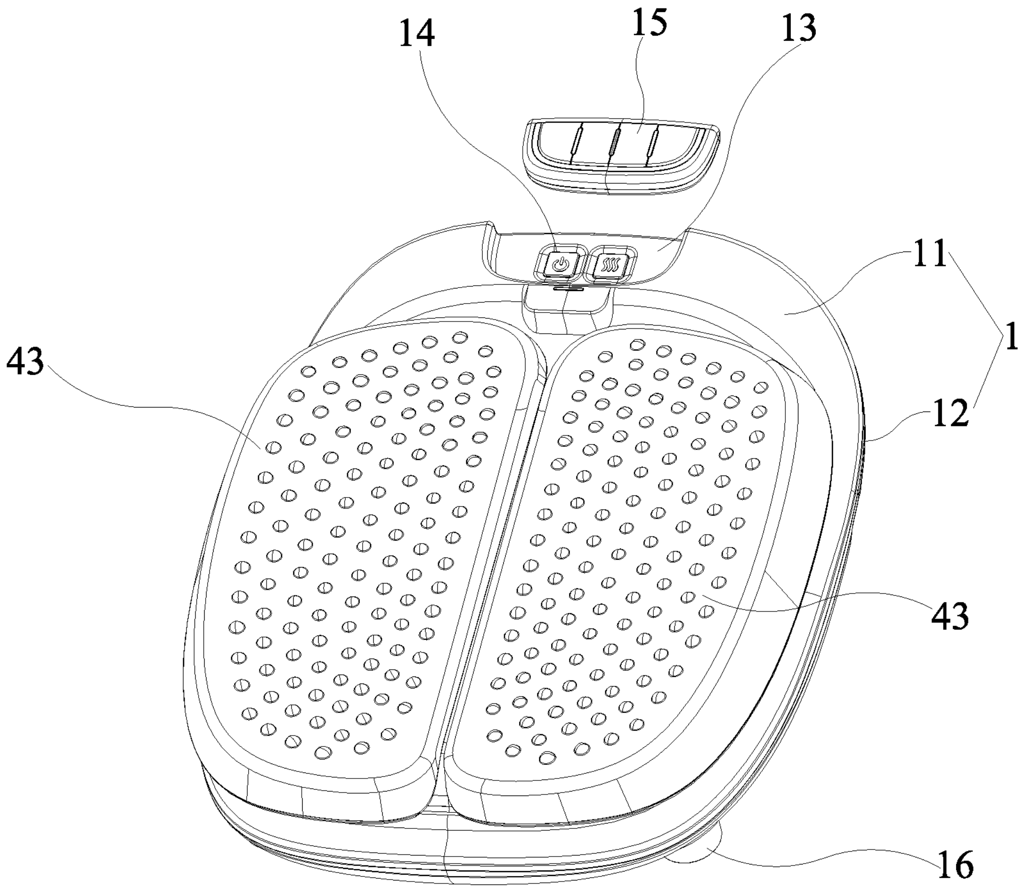
FIG. 2 is a partial exploded view according to the first embodiment of the present invention.
Figure 3:
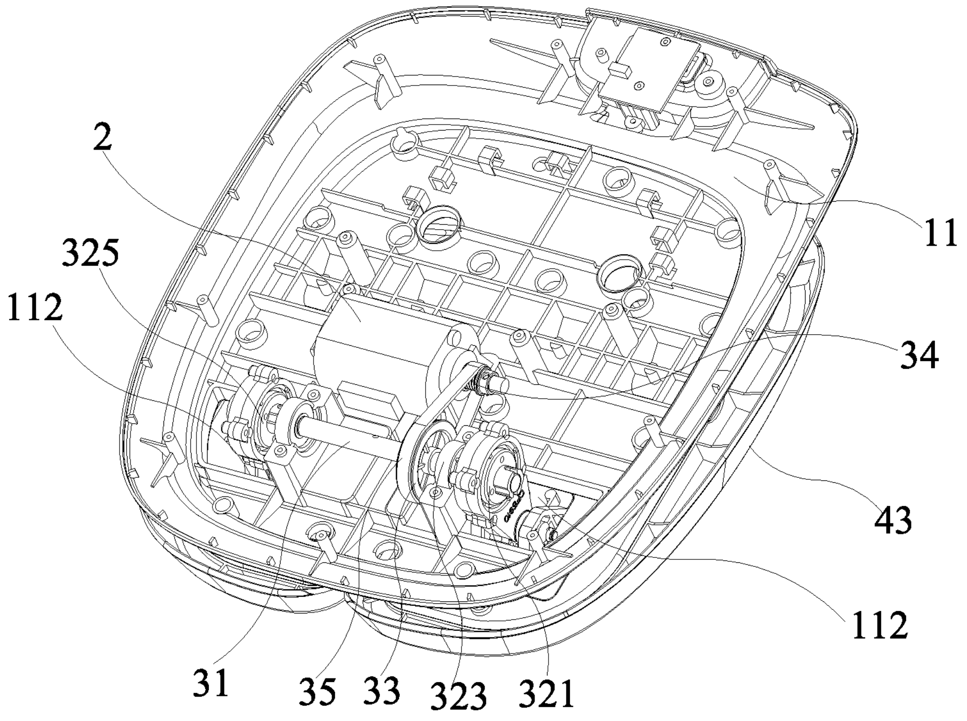
FIG. 3 is a partial perspective view according to the first embodiment of the present invention.
Figure 4:
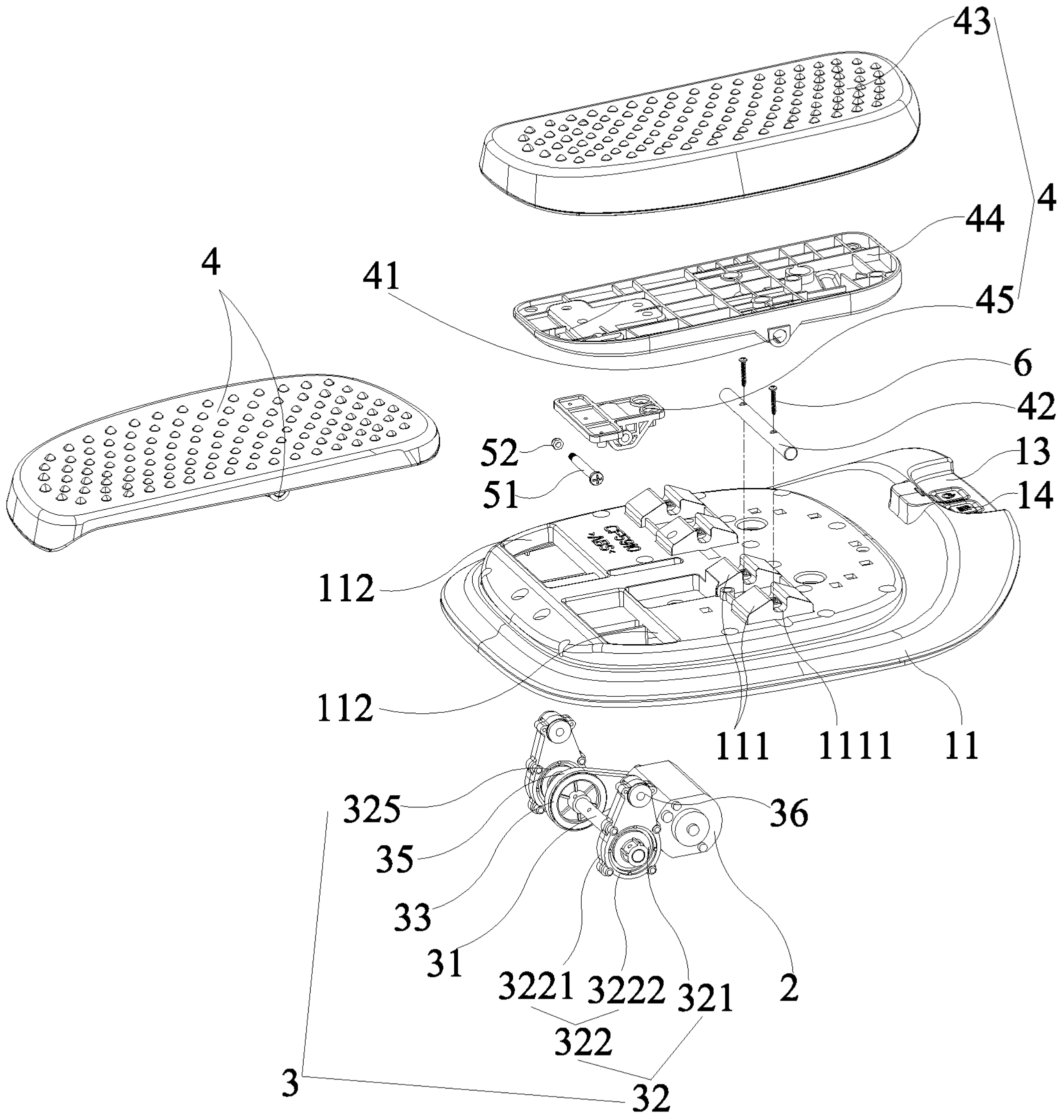
FIG. 4 is a partial exploded view of FIG. 3.
Figure 5:
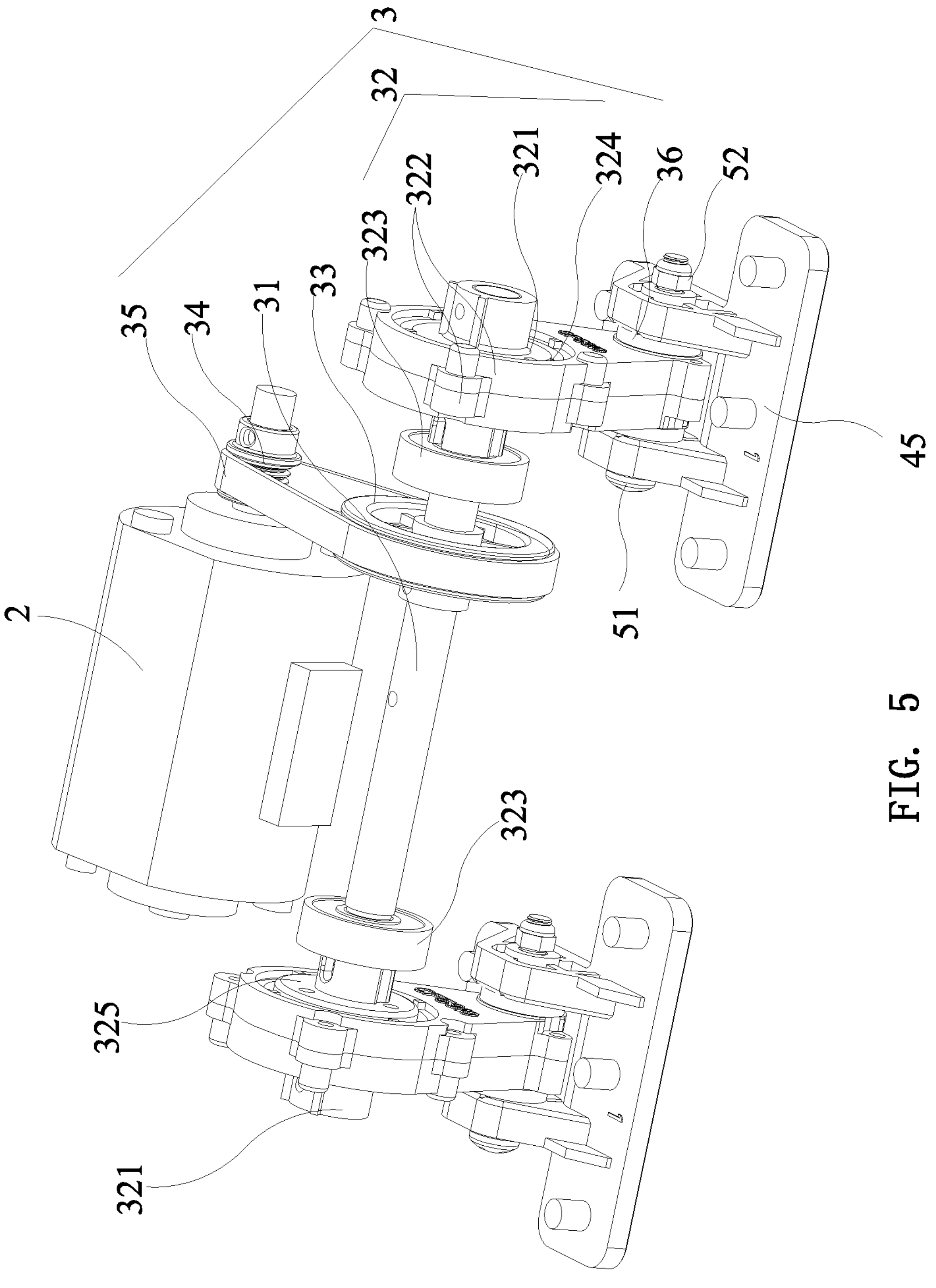
FIG. 5 is a perspective view of the transmission mechanism, the drive device and the massage plate retainer of the present invention after being assembled.
Figure 6:
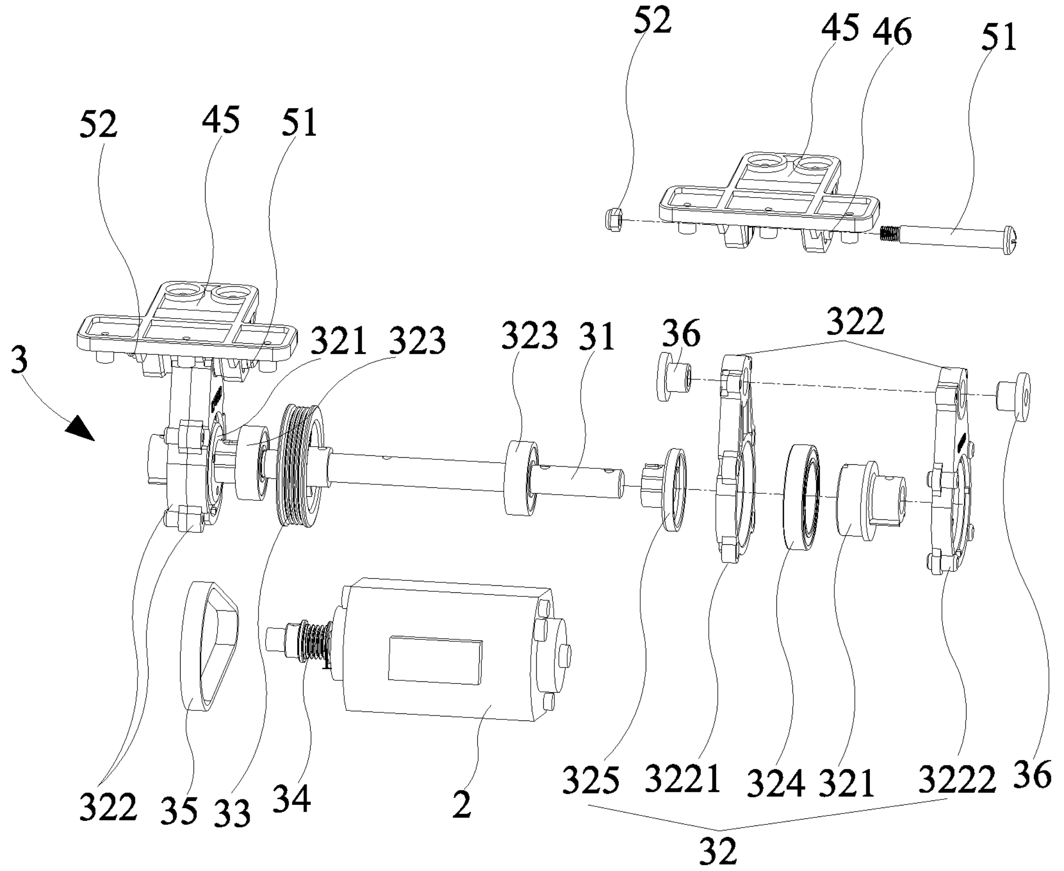
FIG. 6 is an exploded view of FIG. 5.
Figure 7:
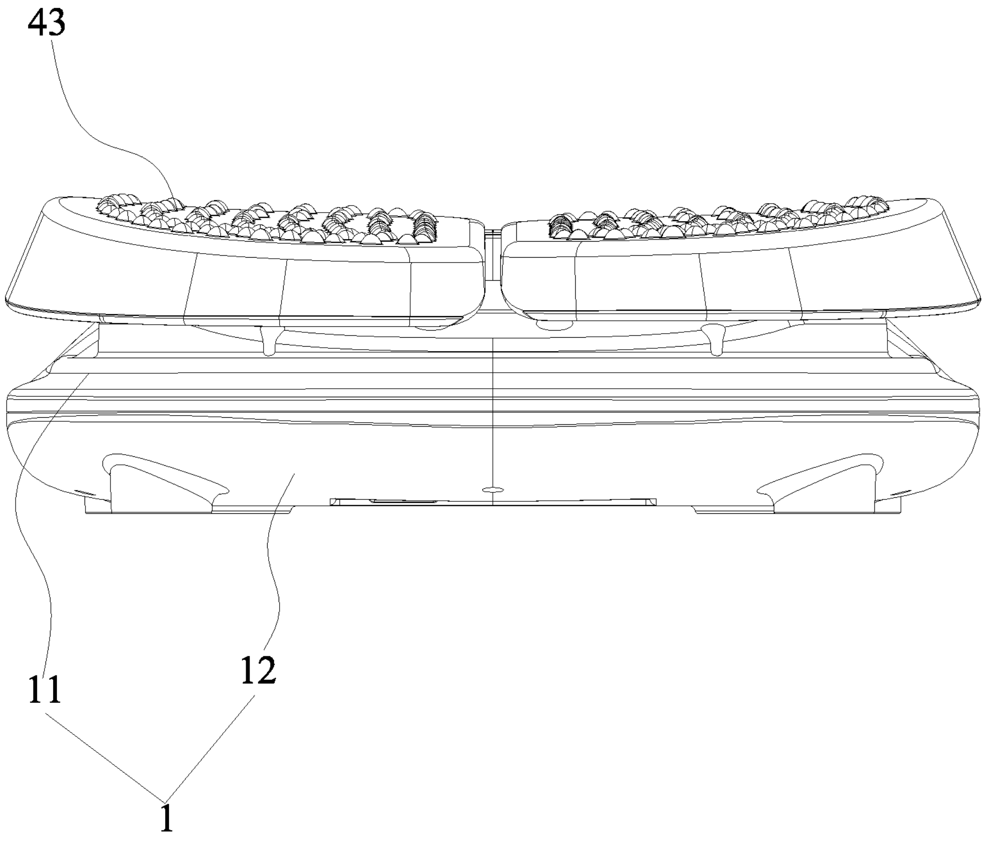
FIG. 7 is a rear view according to a second embodiment of the present invention.
Figure 8:
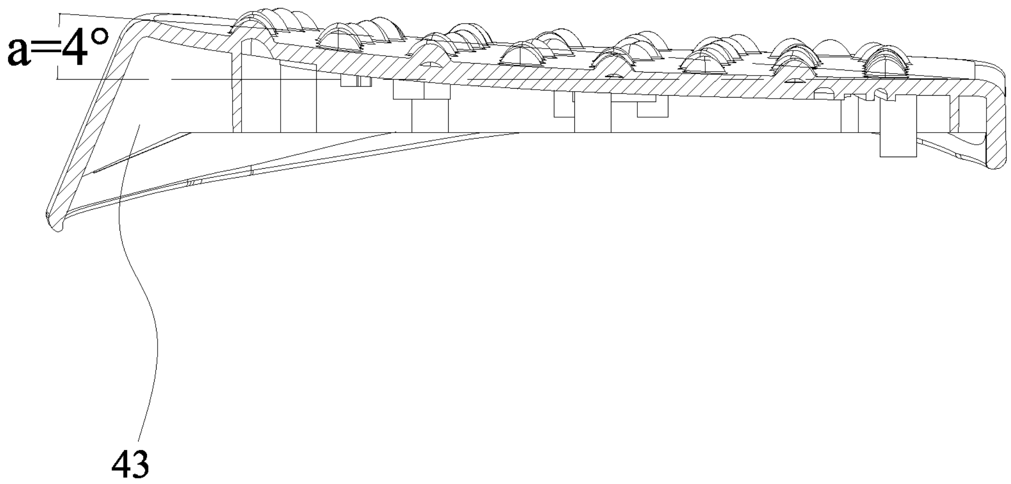
FIG. 8 is a cross-sectional view of the massage plate body according to the second embodiment of the present invention.

Please refer to FIGS. 1 to 8. The present invention discloses a massage machine, comprising a casing unit 1, a drive device 2, a transmission mechanism 3, and two massage plate units 4. Two ends of the transmission mechanism 3 are linked with the massage plate units 4, respectively. The drive device 2 drives the transmission mechanism 3. The transmission mechanism 3 and the drive device 2 are disposed in the casing unit 1. The massage plate units 4 are disposed on the casing unit 1. The drive device 2 may be a motor, but not limited thereto.

Thus, the massage machine provided by the present invention uses a single drive device 2 to drive the transmission mechanism 3, so that the transmission mechanism 3 can link the two massage plate units 4 to massage the user, thereby simplifying the structure. The structure of the massage machine is simple and the overall volume is small.

Furthermore, in order to simplify the structure of the massage machine, the transmission mechanism 3 may include a shaking shaft 31 and two transmission units 32. The transmission units 32 are installed to two ends of the shaking shaft 31, respectively. The output shaft of the drive device 2 is linked to the shaking shaft 31.

A first pulley 33 is fitted on the shaking shaft 31. The first pulley 33 is located between the transmission units 32. A second pulley 34 is fitted on the output shaft of the drive device 2. The first pulley 33 and the second pulley 34 are linked by a belt 35.

Next, the transmission unit 32 includes an eccentric wheel 321 and a cover assembly 322. The eccentric wheel 321 is installed to one end of the shaking shaft 31. The eccentric wheel 321 is inserted into the lower end of the cover assembly 322. The upper end of the cover assembly 322 extends out of the casing unit 1 and is fixedly connected to the corresponding massage plate unit 4, so that the drive device 2 drives the shaking shaft 31 to facilitate the cover assembly 322 to drive the massage plate unit 4 to vibrate up and down.

Furthermore, for the drive device 2 to drive the shaking shaft 31 and for the shaking shaft 31 to drive the cover assembly 322 to vibrate up and down smoothly, the transmission unit 32 further include a first bearing 323, a second bearing 324, and an eccentric wheel cover 325. The eccentric wheel cover 325 is configured to secure the eccentric wheel 321 to the cover assembly 322. The eccentric wheel 321 is fitted to the second bearing 324. The axle of the eccentric wheel 321 extends out of the cover assembly 322. The eccentric wheel cover 325 has a wheel cover shaft extending inward. The first bearing 323 is sleeved on the wheel cover shaft of the eccentric wheel cover 325.

Secondly, in order to facilitate the assembly of the massage machine, the cover assembly 322 may include a bearing inner cover 3221 and a bearing outer cover 3222. The bearing inner cover 3221 is detachably connected to the bearing outer cover 3222 for securing the second bearing 324 and the eccentric wheel 321. The axle of the eccentric wheel 321 extends out of the bearing outer cover 3222. The wheel cover shaft of the eccentric wheel cover 325 extends out of the bearing inner cover 3221.

Further, in order to facilitate the assembly of the massage machine, the casing unit 1 may include an upper casing 11 and a lower casing 12 connected to the upper casing 11. The upper casing 11 may be provided with two shaft seat assembles 111. The middle portion of the back of each massage plate unit 4 is formed with a pivot shaft hole 41. A rotatable massage plate shaft 42 passes through the pivot shaft hole 41. The massage plate shaft 42 is locked to a corresponding one of the shaft seat assemblies 111 by a screw 6. The drive device 2 is fixed to the lower casing 12, so that the massage plate unit 4 is secured to the upper casing 11. The upper casing 11 has perforations 112. The number of the perforations 112 is two. The upper end of the cover assembly 322 passes through the corresponding perforation 112 to be connected to the corresponding massage plate unit 4. In this embodiment, the shaft seat assembly 111 has two spaced shaft seats so that the corresponding massage plate shaft 42 can be secured firmly, but not limited thereto. The shaft seat assembly 11 may have only one shaft seat. The middle portion of the upper end of the shaft seat is formed with a recess 1111 to accommodate the massage plate shaft 42. The massage plate shaft 42 is locked in the recess 1111 by a screw 6.

In addition, in order to improve the overall strength of the massage plate unit 4, the massage plate unit 4 may include a massage plate body 43, a massage plate frame 44, and a massage plate retainer 45. The upper surface of the massage plate body 43 is provided with a plurality of spaced massage protrusions. The massage plate body 43 is fixed on the massage plate frame 44. The pivot shaft hole 41 is defined in the middle portion of the back of the massage plate frame 44. The massage plate retainer 45 is fixed at the front end of the back of the massage plate frame 44. The back of the massage plate retainer 45 is formed with a pivot hole 46. One end of the transmission mechanism 3 (that is, the upper end of the cover assembly 322) is pivotally connected to the corresponding pivot hole 46, so that the transmission mechanism 3 can drive the massage plate unit 4 easily.

Furthermore, one end of the transmission mechanism 3 (that is, the upper end of the cover assembly 322) is provided with a damping pad 36. A fixing screw rod 51 passes through the pivot hole 46 and the corresponding damping pad 36. The end of the fixing screw rod 51 is screwed with a nut 52.

Furthermore, in order to facilitate the control for the operation of the massage machine, the upper surface of the casing unit 1 may be recessed with a button area 13. A plurality of buttons 14 for controlling the operation of the drive device 2 may be provided in the button area 13. A button cover 15 is detachably connected to the button area 13. The button cover 15 is configured to cover the buttons 14. The lower surface of the casing unit 1 may be provided with a plurality of spaced feet 16. A related control circuit board is provided in the casing unit 1 for controlling the operation of the massage machine, which is the prior art and will not be repeated here.

Furthermore, the outer side of the top of the massage plate unit 43 is tilted upward at an angle a of 2° to 20°. In the embodiment shown in FIG. 7 and FIG. 8, the outer side of the top of the massage plate unit 43 is tilted upward at an angle a of 4°, but not limited to this. When in use, the invention can be used to massage the soles of the feet, the back, and other parts of the user's body.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A massage machine, comprising: a casing unit, a drive device, a transmission mechanism and two massage plate units, two ends of the transmission mechanism each arranged to be linked with the two massage plate units respectively, the drive device configured to drive the transmission mechanism, the transmission mechanism and the drive device arranged to be disposed in the casing unit, the two massage plate units arranged to be disposed on the casing unit; the transmission mechanism includes a shaking shaft and two transmission units, the two transmission units are arranged to be installed to each of two ends of the shaking shaft respectively, a first pulley is arranged to be fitted on the shaking shaft, the first pulley is arranged to be located between the two transmission units, a second pulley is arranged to be fitted on an output shaft of the drive device, and the first pulley and the second pulley are arranged to be linked by a belt; each transmission unit includes an eccentric wheel and a cover assembly, the eccentric wheel is mounted to one end of the shaking shaft, the eccentric wheel is arranged to be inserted in a lower end of the cover assembly, and an upper end of the cover assembly is arranged to extend out of the casing unit and is fixedly connected to a corresponding one of the two massage plate units; each transmission unit further includes a first bearing, a second bearing and an eccentric wheel cover the eccentric wheel cover is configured to secure the eccentric wheel to the cover assembly, the eccentric wheel is arranged to be fitted to the second bearing, an axle of the eccentric wheel is arranged to extend out of the cover assembly, the eccentric wheel cover has a wheel cover shaft extending inward, and the first bearing is arranged to be sleeved on the wheel cover shaft of the eccentric wheel cover.

2. The massage machine as claimed in claim 1, wherein the cover assembly includes a bearing inner cover and a bearing outer cover, the bearing inner cover is arranged to be detachably connected to the bearing outer cover for securing the second bearing and the eccentric wheel, the axle of the eccentric wheel is arranged to extend out of the bearing outer cover, and the wheel cover shaft of the eccentric wheel cover is arranged to extend out of the bearing inner cover.

3. The massage machine as claimed in claim 2, wherein the drive device is a motor.

4. The massage machine as claimed in claim 2, wherein an upper surface of the casing unit is arranged to be recessed with a button area, a plurality of buttons for controlling operation of the drive device are arranged to be provided in the button area, a button cover is arranged to be detachably connected to the button area, and the button cover is configured to cover the plurality of buttons, and a lower surface of the casing unit is provided with a plurality of spaced feet.

5. The massage machine as claimed in claim 1, wherein the casing unit includes an upper casing and a lower casing connected to the upper casing, the upper casing is arranged to be provided with two shaft seat assembles, a middle portion of a back of each massage plate unit is formed with a pivot shaft hole, a rotatable massage plate shaft is arranged to pass through the pivot shaft hole of each massage plate unit, each massage plate shaft is arranged to be locked to a corresponding one of the shaft seat assemblies, and the drive device is arranged to be fixed to the lower casing; each massage plate unit further includes a massage plate body, a massage plate frame and a massage plate retainer, each massage plate body is arranged to be fixed on the corresponding massage plate frame, each pivot shaft hole is arranged to be defined in a middle portion of a back of each massage plate frame, each massage plate retainer is arranged to be fixed at a front end of the back of each massage plate frame, a back of each massage plate retainer is arranged to be formed with a pivot hole, and one end of the transmission mechanism is arranged to be pivotally connected to the corresponding pivot hole.

6. The massage machine as claimed in claim 5, wherein one end of the transmission mechanism is arranged to be provided with a damping pad, a fixing screw rod is arranged to pass through one of the pivot holes and the corresponding damping pad, and one end of the fixing screw rod is screwed with a nut.

7. The massage machine as claimed in claim 5, wherein an outer side of a top of each massage plate body is tilted upward at an angle of 2° to 20°.

8. The massage machine as claimed in claim 7, wherein the angle is 4°.

* * * * *